United States Patent [19]

Papa et al.

[11] 3,872,035

[45] Mar. 18, 1975

[54] N-(2-HYDROXYETHYL)-ETHYLENEIMINES AS CATALYSTS FOR POLYISOCYANURATE FOAM FORMATION

[75] Inventors: Anthony J. Papa, St. Albans, W. Va.; William R. Proops, Hockessin, Del.

[73] Assignee: Union Carbide Corporation, New York, N.Y.

[22] Filed: Apr. 12, 1973

[21] Appl. No.: 350,588

Related U.S. Application Data

[63] Continuation of Ser. No. 764,288, Oct. 1, 1968, abandoned.

[52] U.S. Cl.................. 260/2.5 AW, 260/77.5 NC
[51] Int. Cl....................... C08g 22/46, C08g 22/34
[58] Field of Search................. 260/2.5 AW, 2.5 AC

[56] References Cited

UNITED STATES PATENTS

| | | | |
|---|---|---|---|
| 3,560,415 | 2/1971 | Grogler et al. | 260/2.5 AW |
| 3,673,128 | 6/1972 | Hayash et al. | 260/2.5 AW |
| 3,745,133 | 7/1973 | Communale et al. | 260/2.5 AW |
| 3,799,896 | 3/1974 | Moss | 260/2.5 AW |

*Primary Examiner*—H. S. Cockeram
*Attorney, Agent, or Firm*—Eugene C. Trautlein

[57] ABSTRACT

A catalytic process for producing isocyanurate compounds from isocyanates is disclosed. The catalyst is N-(2-hydroxyethyl)- ethyleneimine. The isocyanate can be a monoisocyanate, a polyisocyanate or a polymeric isocyanate. The isocyanurates are known compounds having known uses. The foamed isocyanurate polymers have the same utilities known for the foamed urethane polymers.

10 Claims, No Drawings

N-(2-HYDROXYETHYL)-ETHYLENEIMINES AS CATALYSTS FOR POLYISOCYANURATE FOAM FORMATION

This application is a continuation of our copending application Ser. No. 764,288, filed Oct. 1, 1968 now abandoned.

This invention relates to a novel catalytic process for producing isocyanurate compounds by the use of N-(2-hydroxyethyl)-ethyleneimine as the catalyst in the reaction of isocyanate compounds.

The reaction of isocyanates in the presence of catalysts to produce isocyanurate compounds is known and many catalysts have heretofore been disclosed. The known catalysts, which can be used alone or as mixtures of co- catalysts, include the organic and inorganic bases such as, for example, triethylamine, pyridine, 1,4-diazabicyclo[2.2.2]octane, N,N,N',N'-tetramethyl-1, 4-butanediamine, N,N-dimethylethanolamine, the N-alkali metal and N-alkaline earth metal compounds of amines and carboxylic acid amides as disclosed in U.S. Pat. No. 3,330,828, N,N',N''-tris-(3-dimethylaminopropyl)symhexahydrotriazine, N,N',N'-tris-(3-morpholinylpropyl)-symhexahydrotriazine, 4-ethoxypyridine, dimethylaminopyridine, N-methylethyleneimine, N-ethylethyleneimine, N-benzylethyleneimine, sodium carbonate, sodium acetate, potassium acetate, sodium methoxide, triethyl phosphine, zinc chloride, aluminum trichloride, chronic chloride, calcium naphthenate, lead naphthenate, tetraethylammonium hydroxide, benzyltrimethyl ammonium hydroxide, tetraethylphosphonium hydroxide, trimethylsulfonium hydroxide, tri-dipyridylferrous hydroxide, triethyl phosphine, totyl dimethyl phosphine, sodium 2-ethylhexoate, manganese linoleate, and the like. It is also known that the catalysts can be used in conjunction with other co- catalysts and in U.S. Pat. No. 3,252,942, the above catalysts are used in the presence of mono-N-substituted carbamic esters that are preferably formed in situ by the addition of an alcohol or a phenol to the isocyanate that is to be reacted. Further, it is known that certain epoxides may enhance the catalyst activity, for example, epichlorohydrin, propylene oxide, styrene oxide, ethyl glycidate, and the like. It is also known that various organometallic compounds can also be used as catalysts, U.S. Pat. No. 3,278,492.

We have now found a particular catalyst that has an unexpected and unobvious effect on the reaction of organic isocyanates to produce organic isocyanurates. This catalyst is N-(2-hydroxyethyl)ethyleneimine. The present invention also provides processes for producing rigid polyisocyanurate foams in a single step reaction by the use of this catalyst, either alone or in conjunction with certain known catalysts and epoxides. It also presents methods for producing noncellular isocyanurate compounds useful for coatings, adhesives and molding compounds. The rigid polyisocyanurate foams possess surprisingly good thermal stability and flame resistance properties.

In producing the isocyanurate compound, the isocyanate and catalyst are mixed and the reaction then proceeds quite rapidly.

When a monoisocyanate is the reactant, the isocyanurate produced is the trimer thereof; when a polyisocyanate is used, the isocyanurate is a polyisocyanurate crosslinked resin. In the absence of a blowing agent the polymeric isocyanurate is a non-cellular product but when a blowing agent is present in the reaction mixture a foam can be produced.

The concentration of the N-(2-hydroxyethyl)ethyleneimine catalyst used can vary from about 0.1 to about 10 parts, or more, thereof per hundred parts of isocyanate. Preferably, the catalyst concentration is from about 2 to about 4 parts. Any catalytic amount can be used.

Any suitable inert solvent can be used when a solvent is desired or necessary. Illustrative thereof one can mention ethyl acetate, acetone, dimethyl sulfoxide, dimethylformamide, dioxane, dimethyl sulfone, dimethyl acetamide, butyl acetate, ethyl ether, isoamyl ether, monochlorobenzene, dichlorobenzene, chlorotoluene, chloroform, carbon tetrachloride dimethyl ketone, methyl ethyl ketone, and the like. The particular solvent selected is not of critical importance.

In producing an isocyanurate foam, a blowing agent is employed. These compounds are known in the art and include the low boiling alkanes such as butane, pentane, hexane, cyclohexane, and the like. The preferred blowing agents are the low boiling haloalkanes such as methylene dichloride, trichloromonofluoromethane, dichlorodifluoromethane, dichloromonofluoromethane, trichloromethane, bromotrifluoromethane, chlorotrifluoromethane, chloromethane, 1,1-dichloro-1 -fluoroethane, 1,1-difluoro-1,2,2-trichloroethane, chloropentafluoroethane, 1-chloro-1-fluoroethane, 1-chloro-2-fluoroethane, 1,1,2-trifluoroethane, 1,1,1-trichloro-2,2,2-trifluoroethane, 2-chloro-1,1,1,2,3,3,4,4,4-nonafluorobutane, hexafluorocyclobutane, octafluorocyclobutane, and the like. The property that the blowing agent must possess in order to obtain a satisfactory foam is a boiling point sufficiently below the exotherm of the reaction so that it is vaporized; it is also desirable that it not solvate the cell walls to any appreciable extent. The amount of blowing agent can vary from about 1 to about 50 parts, or more, per hundred parts of isocyanate; preferably from 10 to about 30 parts.

Illustrative of monoisocyanates that can be timerized to produce the isocyanurate trimers of the formula:

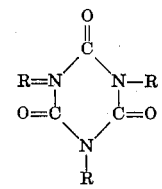

wherein R is the residue fo the isocyanate, one can mention ethyl isocyanate, chloroethyl isocyanate, chloropropyl isocyanate, chlorohexyl isocyanate, chlorobutoxypropyl isocyanate, hexyl isocyanate, phenyl isocyanate the o-, m-, and p- chlorophenyl isocyanates, benzyl isocyanate, napthyl isocyanate, o-ethylphenyl isocyanate, the dichlorophenyl isocyanates, methyl isocyanate, butyl isocyanate, n-propyl isocyanate, octadecyl isocyanate, and the like.

Among the suitable polyisocyanates that can be used to produce polyisocyanurate compounds one can mention 2,4-tolylene diisocyanate, 2,6-tolylene diisocyanate, 4,4'-diphenylmethane diisocyanate, dianisidine diisocyanate, tolidine diisocyanate, hexamethylene diisocyanate, the m- and p-xylylene diisocyanates, tetramethylene diisocyanate, dicyclohexyl-4,4'-methane diisocyanate, cyclohexane-1,4-diisocyanate, 1,5-naphthylene diisocyanate, 4,4'-diisocyanate diphenyl ether, 2,4,6-triisocyanate toluene, 4,4', 4''-triisocyanate triphenyl methane, diphenylene-4,4-diisocyanate, the polymethylene polyphenylisocyanates, as well as any of the other polyisocyanates known to the average skilled chemist in the field of urethane polymers. Those skilled in the art are fully cognizant of many more polyisocyanate compounds. The isocyanates can be used singly or in mixtures of two or more isocyanates.

It has been found that a minor amount of a polyol can also be present. This amount should be kept below about 20 parts per hundred parts of isocyanate if one does not wish to affect the thermal stability and flame resistance to any appreciable extent. If thermal stability and flame resistance are not important for a particular application, larger amounts can be used. It was observed that these properties deteriorated as the concentration of the polyol was increased; at the same time, however, the friability of the resulting isocyanurate foam was improved by the presence of the polyol. The term "polyol" as used herein includes the polyether and polyester polyols known to be used in the field of urethane polymers. Many of these have previously been disclosed and they comprise an extensive list of chemical compounds, some of which are described in U.S. Pat. No. 3,354,100.

In producing foamed reaction products, it is also within the scope of the invention to employ small amounts e.g., about 0.001 to 5.0 percent by weight on the total reaction mixture, of an emulsifying agent such as a polysiloxane-polyoxyalkylene block copolymer having from about 10 to 80 percent by weight of siloxane polymer moiety and from 90 to 20 percent by weight of alkylene oxide polymer moiety in the copolymer molecule, such as the block copolymers described in U.S. Pat. Nos. 2,834,748 and 2,917,480. Another useful class of emulsifiers are the "non-hydrolyzable" polysiloxanepolyoxyalkylene block copolymers. This class of compounds differs from the above-mentioned polysiloxane-polyoxyalkylene block copolymers in that the polysiloxane moiety is bonded to the polyoxyalkylene moiety through direct carbon-to-silicon bonds, rather than through carbon-to-oxygen-to-silicon bonds. These copolymers generally contain from 5 to 95 percent, and preferably from 5 to 50 weight percent, of polysiloxane polymer moiety with the remainder being polyoxyalkylene polymer moiety. The copolymers can be prepared, for example, by heating a mixture of (a) a polysiloxane polymer containing a siliconbonded, halogen-substituted monovalent hydrocarbon group, and (b) an alkali metal salt of a polyoxyalkylene polymer, to a temperature sufficient to cause the polysiloxane polymer and the salt to react to form the block copolymer. Other useful emulsifiers include such materials as polyethoxylated vegetable oils. Although the use of an emulsifier is desirable to influence the type of foam structure that is formed, the foam products of the invention can be prepared without emulsifiers in some cases.

The presence of an epoxide can in some instances enhance the polymerization reaction. The amount thereof can vary up to 100 mole per cent based on the isocyanate, preferably from about 0.1 to about 20 mol per cent may be used. Illustrative of suitable epoxides one can mention epichlorohydrin, propylene oxide, styrene oxide, butadiene oxide, ethyl glycidate, diglycidyl ether of bis-2-(4-hydroxyphenyl)propane, 3,4-epoxycyclohexyl 3,4-epoxycyclohexylacetate, glycidyl phenyl ether, glycidyl stearate, glycidyl novalac resins, 1,1,3-tris(4-hydroxyphenyl)propane, triglycidyl ether, diglycidyl ether of 1,4-butanediol and the condensates of epichlorohydrin and an aliphatic or aromatic polyol such as trimethylol propane, 1,1,3,3-tetrakis(4-hydroxyphenyl)propane, and the like.

The following examples further serve to illustrate the invention.

EXAMPLE 1

To 25 grams of phenyl isocyanate there was added 0.694 gram) of N-(2-hydroxyethyl)ethylene imine. An exothermic reaction occurred that reached a peak temperature of 191°C. in 99 seconds. There was recovered 25 grams of N,N', N''-triphenyl isocyanurate.

The maximum temperature achieved and the time required for the reaction to reach the maximum peak temperature are means of measuring the rate of speed of the reaction and the catalytic activity of the catalyst. A higher temperature indicates that the reaction is proceeding rapidly with the generation of substantial heat of reaction. The period of time needed for the reaction to achieve maximum temperature is also an indication of the rate of reaction; the shorter the time, the faster the reaction.

In Table I, the catalytic activity of a larger number of imine compounds is illustrated. The examples are used 25 grams of phenyl isocyanate (0.21 mole) and 0.038 gram equivalents of imine per gram equivalent of isocyanate.

TABLE I

| Run | Imine Compound | Maximum Temperature, °C | Time sec. |
|---|---|---|---|
| 1 | N-(2-hydroxyethyl)ethylene imine | 191 | 99 |
| 2 | N-(2-hydroxyethyl)ethylene imine | 186 | 96 |
| 3 | N-(2-hydroxyethyl)ethylene imine | 197 | 55 |
| 4 | ethylene imine | <25 | — |
| 5 | 2-methyl ethylene imine | <25 | — |
| 6 | N-ethyl ethylene imine | 101 | 420 |
| 7 | 1,2,4-tris[2-(N-aziridinyl)-ethyl]-trimellitate | 133 | 302 |
| 8 | N-(2-morpholinoethyl)ethylene imine | 125 | 520 |
| 9 | N-(2-aminoethyl)ethylene imine | 133 | 534 |
| 10 | N-(2-phenylethyl)ethylene imine | 29 | 40 |
| 11 | N-(2-cyanoethyl)ethylene imine | <25 | — |
| 12 | ethylaziridinyl formate | <25 | — |
| 13 | tris-N-(2-methylaziridinyl)phosphine oxide | <25 | — |

In runs 4, 5, 11, 12 and 13 the temperature rise was of the order of a few degrees and never reached 25°C. This is indicative of a very low catalytic activity. These runs failed to produce N,N',N''-triphenyl isocyanurate during a period of one hour. In runs 6, 7, 8 and 9 exotherms were reached only after a comparatively long period of time indicating a slow reaction; the peak exotherms were significantly lower than those obtained in runs 1, 2, and 3 it required a significantly longer period of time to reach them. In run 10, the peak exotherm was reached in a short time but it was a very low temperature of 29°C., indicating that the reaction was proceeding at a very slow rate. It was unexpected and unobvious that N-(2-hydroxyethyl)ethylene imine was the only imine catalyst among the eleven compounds tested that showed this high catalytic activity.

EXAMPLE 2

In this example the unexpected catalytic activity of N-(2-hydroxyethyl)ethylene imine was used to produce an isocyanurate foam. None of the other ethylene imine compounds used for comparative purposes in the same formulation were capable of producing a foam.

A recipe was prepared containing 100 grams of polymethylene polyphenylisocyanate having about 32 per cent free isocyanate content, 2 grams of a conventional polysiloxane polyoxyalkylene block copolymer surfactant, 13 grams of fluorotrichloromethane and mixed throughly for 10 seconds. Then 2.5 grams of N-(2-hydroxyethyl)ethylene imine was stirred in for about 15 seconds and the mixture was poured into an 8 by 8 inches carboard box. A rigid foamed isocyanurate polymer was obtained and cured for 15 minutes at 70°C. The cream time for the reaction was 35 seconds, the rise time was 240 seconds and the tack-free time was 290 seconds. The foam had a density of 3.55 pounds per cubic foot.

Using the same formulation and procedure, attempts were made to produce foams using other ethylene imine compounds. In no instance was the attempt successful. The reuslts are reported in Table II.

hanced catalytic effect. However, in producing isocyanurate polymer foams, the enhancement of activity was observed with only a few of the amines tested in conjunction with N-(2-hydroxyethyl)-ethylene imine; specifically N,N,N',N'-tetramethyl-1,3-butanediamine (TMBDA), N,N-dimethylethanolamine (DMEA), bis[-2-(N,N-dimethylamino)ethyl]ether (DMAEE), 1,4-diazabicyclo-[2.2.2]octane (DABCO), N,N',N''-tris(dimethylaminopropyl)-sym-hexahydrotriazine (DMAPHHT), 2-(N,N-dimethylaminomethyl)-phenol (2-DMAMP), and 2,4,6-tri(N,N-dimethylaminomethyl)-phenol (2,4,6-DMAMP) showed the enhancement effect. The combination of N-(2-hydroxyethyl)ethylene imine with imidazole, 1- or 2- methylimidazole, 1,2-dimethylimidazole, 2-methylimidazoline, 2-phenylimidazoline, morpholine, N-(2-aminoethyl)morpholine, N-(2-hydroxyethyl)piperazine, 4-dimethylaminopyridine, alpha-picoline, 2-hydroxyethylpyridine, N-methylamiline, aniline, N,N-dimethylbenzylamine, N-ethylcyclohexylamine, N-methylethanolamine, triethamine, or triethanolamine did not show an enhancement and did not produce satisfactory isocyanurate polymer foams. These results indicated that not all amines can be used in combination with the catalyst of this invention.

EXAMPLE 3

To a solution of 1.12 grams of DABCO in 40 grams of fluorotrichloromethane there was added 3.75 grams of N-(2-hydroxyethyl)ethylene imine. This solution was added to a mixture of 300 grams of polymethylene polyphenylisocyanate having about 32 per cent free isocyanato and 12 grams of the same surfactant used in Example 2. After thorough mixing the mixture was poured into an 8 inch square box and a rigid foamed isocyanurate polymer was obtained and cured for 15 minutes at 70°C. The cream time for the foam reaction was 34 seconds, the rise time was 150 seconds and the tack free time was 150 seconds. The foam had a hard surface and fine cells.

In a similar manner, isocyanurate polymer foams

TABLE II

| | |
|---|---|
| 2-Methyl ethylene imine | — Slight exotherm but no foam. |
| N-Ethyl ethylene imine | — Foamed but collapsed; cream time was 200 seconds, rise time was not complete after 480 seconds; foam collapsed. |
| 1,2,4-tris[2-(N-aziridinyl)-ethyl]trimellitate | — No exotherm or foam. |
| N-(2-morpholinoethyl)-ethylene imine | — Slight exotherm but no foam. |
| N-(2-aminoethyl)ethylene imine | — Slight exotherm but no foam. |
| N-(2-phenylethyl)ethylene imine | — No exotherm or foam. |
| N-(2-cyanoethyl)ethylene imine | — No exotherm or foam. |
| Ethylsziridinyl formate | — No exotherm or foam. |
| Tris-N-(2-methylaziridinyl)-phosphine oxide | — No exotherm or foam. |

As previously indicated a known amine catalyst could be used in conjunction with the N-(2-hydroxyethyl)ethylene imine catalyst in the reaction of the monoisocyanates this mixture generally showed an enwere produced using a combination of N-(2-hydroxyethyl)ethylene imine and an amine. The formulation and process used were as described in Example 3; the results are tabulated in Table III.

TABLE III

| Example | Cocatalyst Amine | g. | CT sec | RT sec | TFT sec | Remarks |
|---|---|---|---|---|---|---|
| 3. | DABCO | 1.12 | 34 | 150 | 150 | Hard surface, fine cells |
| 4. | TMBDA | 1.42 | 130 | 490 | 470 | Hard smooth surface, |

TABLE III-Continued

| Example | Cocatalyst Amine g. | | CT sec | RT sec | TFT sec | Remarks |
|---|---|---|---|---|---|---|
| 5. | DMEA | 1.78 | 15 | 130 | 80 | large cells Slightly soft surface, Medium cells |
| 6. | DMAEE | 1.60 | 40 | 200 | 150 | Slightly soft surface, large glassy cells |
| 7. | DMAPHHT | 1.13 | 60 | 200 | 175 | Hard surface, medium cells |
| 8. | 2-DMAMP | 3.03 | 35 | 250 | 225 | Very hard surface, medium cells |
| 9. | 2,4,6-DMAMP | 1.77 | 40 | 280 | 230 | Very hard surface, large cells |

CT = cream time
RT = rise time
TFT = tack-free time

All of the foams in Examples 3 to 9 were considered satisfactory. In all instances the amount of the amine cocatalyst used was an amount calculated to give 0.06 amine equivalents based on the amount of isocyanate present. The amine equivalents are determined by dividing the molecular weight of the amine compound by the number of amino nitrogen atoms present in the molecule.

For comparative purposes the same formulation was catalyzed with N-ethyl ethylene imine. The use of the N-ethyl ethylene imine with the same amine cocatalysts used in Examples 3 to 9 failed to produce a satisfactory rigid foam in all instances. Ther results are tabulated in Table IV. In these experiments 1.02 grams of N-ethyl ethylene imine was used.

TABLE IV

| Exp. | Amine | CT | RT | TFT | Remarks |
|---|---|---|---|---|---|
| a | DABCO | 40 | 120 | 130 | Hollow center |
| b | TMBDA | 220 | 600 | 420 | Large glassy cells |
| c | DMEA | 15 | 90 | 90 | Soft; large glassy cells |
| d | DMAEE | 100 | 270 | 200 | Hollow center |
| e | DMAPHHT | 160 | 315 | 315 | Hollow center |
| f | 2-DMAMP | 40 | 370 | 540 | Soft; large glassy cells |
| g | 2,4,6-DMAMP | 35 | 540 | 600 | Soft; large glassy cells |

In the following series of examples, Table V, the foams were produced as described in Example 3 using 100 grams of the same polyisocyanate, 4 grams of the same polysiloxane polyoxyalkylene block copolymer surfactant, 13.3 grams of fluorotrichloromethane, 1.25 grams of N-(2-hydroxyethyl)-ethylene imine and 0.02 amine equivalent of the amine cocatalyst per 100 grams of the isocyanate.

In the following laboratory examples, the effect of the presence of an epoxide is illustrated. The formulations contained 100 parts of polymethylene polyphenylisocyanate (AFPI) having about 31 per cent free isocyanate, 15 parts of the epoxide, 4 parts of the same polysilcxane polyoxyalkylene block copolymer surfactant, 16.7 parts of fluorotrichloromethane, 1.25 parts of N-(2-hydroxyethyl)ethylene imine and 1.25 parts of DABCO. The ingredients were mixed and permitted to react as described in Example 3; the epoxide was previously mixed into the isocyanate and surfactant mixture. The results are tabulated below:

TABLE V

| Example | 10 | 11 | 12 | 13 | 14 | 15 |
|---|---|---|---|---|---|---|
| Amine Cocatalyst, g. | | | | | | |
| DABCO | 1.12 | — | — | — | — | — |
| TMBDA | — | 1.42 | — | — | — | — |
| DMEA | — | — | 1.78 | — | — | — |
| DMAEE | — | — | — | 1.60 | — | — |
| 2,4,6-DMAMP | — | — | — | — | 1.77 | — |
| 2-DMAMP | — | — | — | — | — | 3.03 |
| Foaming Properties: | | | | | | |
| Cream time, sec. | 34 | 130 | 15 | 40 | 40 | 35 |
| Rise time, sec. | 150 | 490 | 130 | 200 | 280 | 250 |
| Tack free time, sec. | 150 | 470 | 80 | 150 | 230 | 225 |
| Foam Properties: | | | | | | |
| Core density, pcf. (ASTM:D-1622) | 1.86 | 2.04 | 1.75 | 2.02 | 2.24 | 2.03 |
| Closed cells, % (ASTM:D-1940) | 87.0 | 78.8 | 81.5 | 84.5 | 85.1 | 85.7 |
| Compressive strength, psi. (ASTM:D-1621) | | | | | | |
| at 25°C: parallel | 28 | 20 | 21 | 24 | 27 | 25 |
| perpendicular | 11 | 13 | 10 | 16 | 16 | 13 |
| Friability (ASTM:C-367 and C-421) | | | | | | |
| Weight Loss, % 2 min. | 25 | 45 | 33 | 40 | 35 | 39 |
| 10 min. | 91 | 100 | 97 | 100 | 97 | 99 |

TABLE VI

| Example | 16 | 17 | 18 | 19* |
|---|---|---|---|---|
| Epoxide | none | A | B | C |
| Cream time, sec. | 45 | 60 | 7 | 15 |
| Rise time, sec. | 165 | 215 | 95 | 135 |
| Tack free time, sec. | 203 | 250 | 123 | — |
| Foam Properties: | | | | |
| Core density, pcf. | 2.20 | 2.45 | 2.03 | 2.22 |
| Closed cells, % | 89.6 | 90.4 | 86.5 | 78.2 |
| Compressive strength, psi at 25°C: parallel | 35.2 | 43.5 | 25.6 | 17 |
| perpendicular | 13.5 | 18.7 | 10.4 | 9 |
| Friability Weight loss, % 2 min. | 21 | 23 | 34 | 29 |
| 10 min. | 86 | 91 | 100 | 94 |
| 20 min. | 100 | 100 | 100 | — |

Epoxide A = 3,4-epoxycyclohexyl 3,4-epoxycyclohexylacetate
Epoxide B = bis-2-4-hydroxyphenyl propane diglycidyl ether
Epoxide C = epsilon - caprolactone
* Used 2 parts of the surfactant, 13.3 parts of fluorotrichloromethane and 2.87 parts of N-(2-hydroxyethyl)ethylene imine. No DABCO.

Expodies A and B co-reacted with the isocyanate to produce a copolymerized isocyanurate product. In larger scale operations, however, Epoxide B acts as a co-catalyst which activates the reaction to such a rate that it cannot be easily controlled under normal commercial operating conditions. The reaction of the isocyanate and the epoxide produces oxazolidone groups as well as isocyanurate groups in the molecule, a fact known to chemists.

EXAMPLE 20

The same formulation and procedures that were used in Examples 16 and 18 were employed with the exception that the epoxide was replaced by 15 parts of a polyol which was the propylene oxide adduct of sorbitol having an hydroxyl number of about 490. The cream time was 5 seconds, the rise time was 80 seconds and the track free time was 55 seconds. The foam had a core density of 2.29 pcf, and a closed cell content of 86.2 per cent. Compressive strength at 25°C was 34.7 psi parallel to foam rise and 12.6 psi perpendicular thereto. Friability was improved as shown below:

| Friability | | |
|---|---|---|
| Density, pcf. | | 2.01 |
| Weight loss, % | 2 min. | 11 |
| | 10 min. | 57 |
| | 20 min. | 88 |

What is claimed is:

1. A process for producing a closed cell rigid organic polyisocyanurate foam by reacting and foaming a reaction mixture comprising an organic polyisocyanate, a catalytic amount of N-(2-hydroxyethyl)-ethylene imine and a blowing agent, said blowing agent consisting of a low boiling alkane or a low boiling haloalkane.

2. A process as claimed in claim 1 for producing a closed cell rigid organic polyisocyanurate foam by reacting and foaming a reaction mixture consisting essentially of an organic polyisocyanate, a catalytic amount of N-(2-hydroxyethyl)-ethylene imine, a blowing agent, said blowing agent consisting of a low boiling alkane or a low boiling haloalkane and a minor amount of a polyol.

3. A process as claimed in claim 1 for producing a closed rigid organic polyisocyanurate foam by reacting and foaming a reaction mixture consisting essentially of an organic polyisocyanate, a catalytic amount of N-(2-hydroxyethyl)-ethylene imine, a blowing agent, said blowing agent consisting of a low boiling alkane or a low boiling haloalkane and a minor amount of an epoxide.

4. A process as claimed in claim 1 for producing a closed cell rigid organic polyisocyanurate foam by reacting and foaming a reaction mixture consisting essentially of an organic polyisocyanate, a catalytic amount of N-(2-hydroxyethyl)-ethylene imine, a blowing agent, said blowing agent consisting of a low boiling alkane or a low boiling haloalkane, a minor amount of polyol, said polyol being present in an amount below about 20 parts per 100 parts of the organic polyisocyanate, and an epoxide in an amount of from about 0.1 to about 20 mole percent based on the organic polyisocyanate.

5. A process as claimed in claim 1 for producing a closed cell rigid organic polyisocyanurate foam by reacting and foaming a reaction mixture consisting essentially of an organic polyisocyanate, a catalytic amount of N-(2-hydroxyethyl)-ethylene imine, a blowing agent, said blowing agent consisting of a low boiling alkane or a low boiling haloalkane, a minor amount of polyol, said polyol being present in an amount below about 20 parts per 100 parts of the organic polyisocyanate, an epoxide in an amount of from about 0.1 to about 20 mole percent based on the organic polyisocyanate and, as an emulsifying agent, a polysiloxane-polyoxyalkylene block copolymer having from about 10 to 80 per cent by weight of siloxane polymer moiety and from 90 to 20 per cent by weight of alkylene oxide polymer moiety in the copolymer molecule.

6. A process as claimed in claim 1 for producing a closed cell rigid organic polyisocyanurate foam by reacting and foaming a reaction mixture consisting essentially of an organic polyisocyanate, a catalytic amount of N-(2-hydroxyethyl)-ethylene imine, a blowing agent, said blowing agent consisting of a low boiling alkane or a low boiling haloalkane, a minor amount of polyol, said polyol being present in an amount below about 20 parts per 100 parts of the organic polyisocyanate, an epoxide in an amount of from about 0.1 to about 20 mole percent based on the organic polyisocyanate, a polysiloxane-polyoxyalkylene block copolymer emulsifying agent having from about 10 to 80 percent by weight of siloxane polymer moiety and from 90 to 20 per cent by weight of alkylene oxide polymer moiety in the copolymer molecule and a catalytic amount of N,N,N',N' tetramethyl-1,3-butanediamine, N,N-dimethylethanolamine, bis ether, 1,4-diazabicyclooctane, N,N',N''-tris(dimethylaminopropyl)-symhexahydrotriazine, 2-(N,N-dimethylaminomethyl)-phenol or 2,4,6-tri(N,N-dimethylaminomethyl)-phenol.

7. A process as claimed in claim 1 wherein the organic polyisocyanate is a polymethylene polyphenylisocyanate and the blowing agent is fluorotrichloromethane.

8. A process for producing a rigid organic polyisocyanurate foam by reacting and foaming a reaction mixture comprising an organic polyisocyanate, a catalytic amount of N-(2-hydroxyethyl)-ethylene imine and a blowing agent consisting of a low boiling alkane or a low boiling haloalkane.

9. A process for producing a rigid organic polyisocyanurate foam by reacting and foaming a reaction mixture consisting essentially of a polymethylene polyphenylisocyanate, a catalytic amount of N-(2-hydroxyethyl)-ethylene imine, a blowing agent consisting of a low boiling haloalkane and a minor amount of an epoxide.

10. A process for producing a rigid organic polyisocyanurate foam by reacting and foaming a reaction mixture consisting essentially of polymethylene polyphenylisocyanate, a catalytic amount of N-(2-hydroxyethyl)-ethylene imine, a blowing agent consisting of fluorotrichloromethane, a minor amount of 3,4-epoxycyclohexyl 3,4-epoxycyclohexylacetate, and, as an emulsifying agent, a polysiloxane-polyoxyalkylene block copolymer.

* * * * *